(12) United States Patent
Mizuno et al.

(10) Patent No.: US 11,302,193 B2
(45) Date of Patent: Apr. 12, 2022

(54) INFORMATION PROCESSING DEVICE, INFORMATION PROCESSING METHOD, AND NON-TRANSITORY STORAGE MEDIUM THAT CONTROL PROVISION OF PARKING SPACES

(71) Applicant: TOYOTA JIDOSHA KABUSHIKI KAISHA, Toyota (JP)

(72) Inventors: Yuko Mizuno, Nagoya (JP); Misa Ejiri, Nagoya (JP); Kazuyuki Kagawa, Nisshin (JP); Yuta Oshiro, Nagoya (JP); Katsuhito Kito, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/208,290

(22) Filed: Mar. 22, 2021

(65) Prior Publication Data
US 2021/0304605 A1   Sep. 30, 2021

(30) Foreign Application Priority Data

Mar. 27, 2020   (JP) .............................. JP2020-057947

(51) Int. Cl.
*B60W 30/06* (2006.01)
*G08G 1/14* (2006.01)
*G06Q 30/02* (2012.01)

(52) U.S. Cl.
CPC .............. *G08G 1/148* (2013.01); *B60W 30/06* (2013.01); *G06Q 30/0206* (2013.01); *G08G 1/146* (2013.01)

(58) Field of Classification Search
None
See application file for complete search history.

(56) References Cited

U.S. PATENT DOCUMENTS

| | | | | |
|---|---|---|---|---|
| 7,538,690 | B1* | 5/2009 | Kaplan ................... | G01C 21/20 340/932.2 |
| 8,928,494 | B2* | 1/2015 | Aivas ..................... | G08G 1/146 340/932.2 |
| 9,159,228 | B2* | 10/2015 | Wang ...................... | G08G 1/141 |
| 9,613,532 | B2* | 4/2017 | Smullin ............. | G01C 21/3685 |
| 10,795,359 | B2* | 10/2020 | Choi ................... | G05D 1/0088 |
| 2019/0122448 | A1* | 4/2019 | Volz ................... | G06Q 30/0258 |

FOREIGN PATENT DOCUMENTS

JP    2019-003456 A    1/2019

* cited by examiner

*Primary Examiner* — John F Mortell
(74) *Attorney, Agent, or Firm* — Sughrue Mion, PLLC

(57) ABSTRACT

A controller of a server device that is an information processing device according to the present disclosure executes setting a ratio between number of first parking spaces and number of second parking spaces, on the basis of a past actual utilization figure of a parking lot including the first parking spaces with a first time limit and the second parking spaces that allow parking for a longer time period than the first time limit, and controlling provision of the first parking spaces and the second parking spaces at the set ratio.

20 Claims, 10 Drawing Sheets

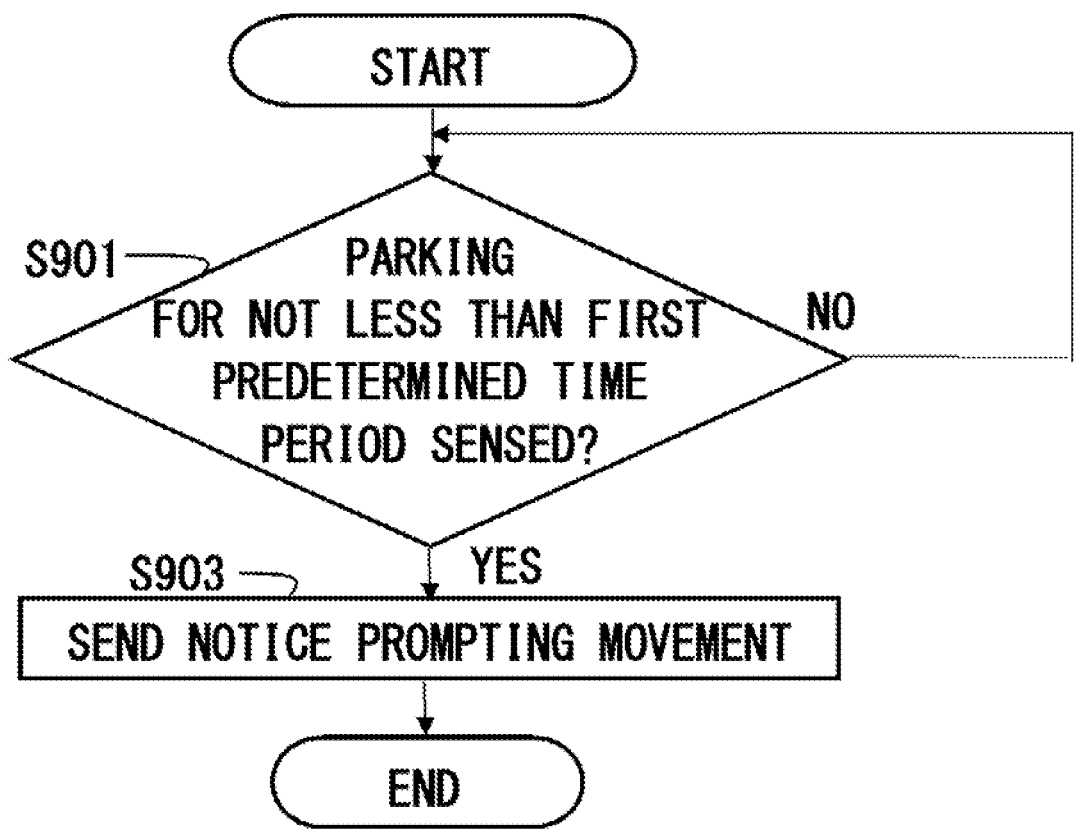

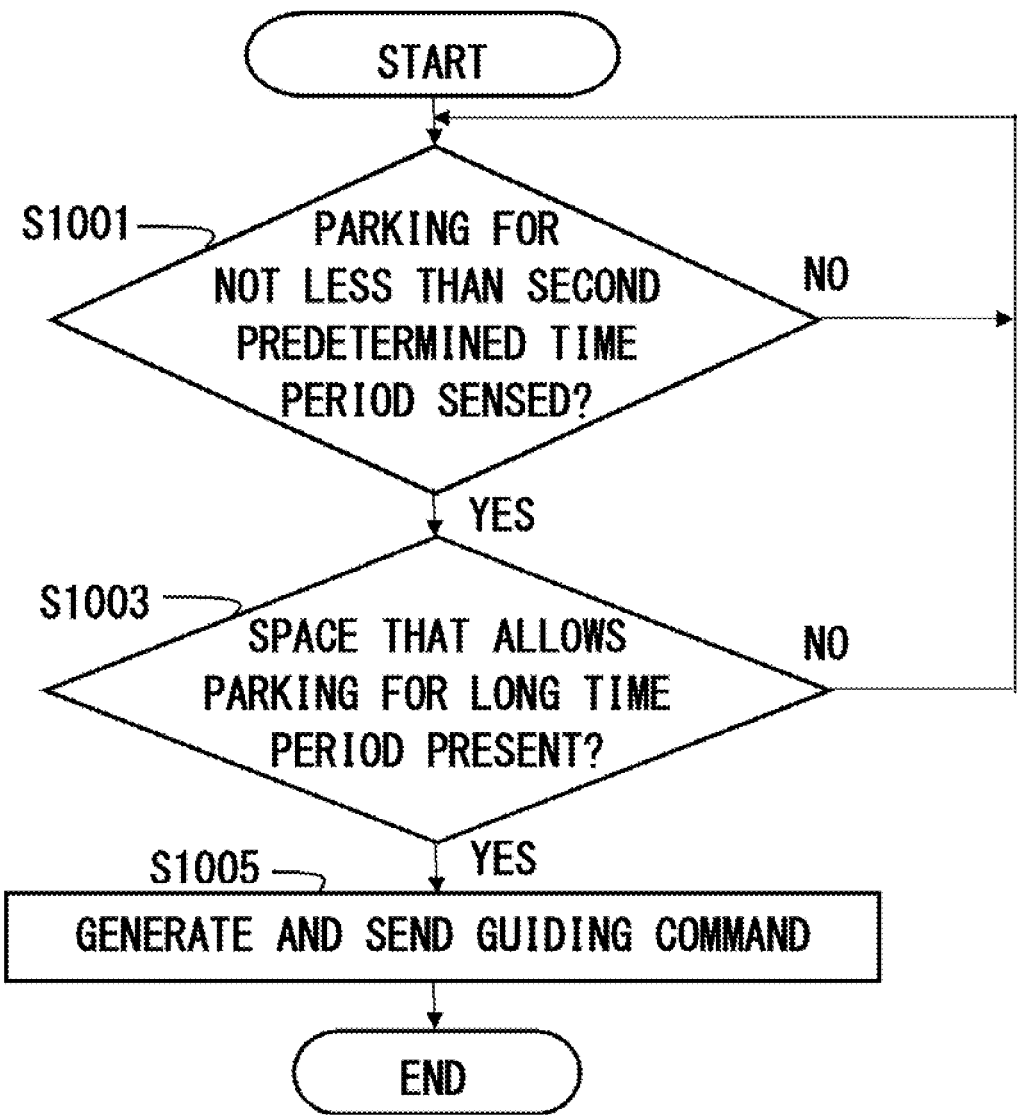

INFORMATION PROCESSING DEVICE, INFORMATION PROCESSING METHOD, AND NON-TRANSITORY STORAGE MEDIUM THAT CONTROL PROVISION OF PARKING SPACES

CROSS REFERENCE TO THE RELATED APPLICATION

This application claims the benefit of Japanese Patent Application No. 2020-057947, filed on Mar. 27, 2020, which is hereby incorporated by reference herein in its entirety.

BACKGROUND

Technical Field

The present disclosure relates to an information processing device, an information processing method, and a non-transitory storage medium.

Description of the Related Art

There is proposed the process of setting, in accordance with a demand, a parking-allowed space for vehicle parking on a road as occasion arises and making the parking-allowed space known (see, for example, Patent Document 1).

CITATION LIST

Patent Document

[Patent Document 1] Japanese Patent Laid-Open No. 2019-003456

SUMMARY

One or more aspects of the present disclosure are directed to more suitably allow parking space management that accords with a demand.

One aspect of an embodiment of the present disclosure may be exemplified by an information processing device comprising a controller including at least one processor. The controller may execute setting a ratio between number of first parking spaces and number of second parking spaces, on the basis of a past actual utilization figure of a parking lot including the first parking spaces with a first time limit and the second parking spaces that allow parking for a longer time period than the first time limit, and controlling provision of the first parking spaces and the second parking spaces at the set ratio. Another aspect of the embodiment of the present disclosure may be exemplified by an information processing method. Additionally, still another aspect of the embodiment of the present disclosure may be exemplified by a computer-readable storage medium non-transitorily storing a program to be conducted by at least one computer, such as the above-described information processing device.

The information processing device more suitably allows parking space management that accords with a demand.

BRIEF DESCRIPTION OF THE DRAWINGS

FIG. 9 is a flowchart of a still different process by the control unit of the server device in the system in FIG. 1; and FIG. 10 is a flowchart of a still different process by the control unit of the server device in the system in FIG. 1.

DESCRIPTION OF THE EMBODIMENTS

The present embodiment exemplifies an information processing device including a controller. The controller may execute setting a ratio between number of first parking spaces and number of second parking spaces, on the basis of a past actual utilization figure of a parking lot including the first parking spaces with a first time limit and the second parking spaces that allow parking for a longer time period than the first time limit, and controlling provision of the first parking spaces and the second parking spaces at the set ratio.

The controller of the information processing device may be, for example, adapted to management of parking spaces in a parking lot that allows parking for a short time period is useful. The parking lot may include first parking spaces with a first time limit and second parking spaces that allow parking for a longer time period than the first time limit. Each first parking space may be configured to be changeable from/to the second parking space. The controller may execute, for example, predicting a demand for the first time limit of the parking lot on the basis of a past actual utilization figure of the parking lot. For example, in a situation where parking is desired but continued parking is not originally desired, such as at the time of pickup and drop-off, a demand for the first time limit of the parking lot may be higher. The controller may execute changing a ratio between the first parking spaces and the second parking spaces in the parking lot in accordance with the prediction. The changing the ratio can include changing a predetermined number of second parking spaces to first parking spaces in accordance with a prediction as described earlier. The controller may execute controlling provision of the first parking spaces and the second parking spaces at the set ratio. With this processing, the information processing device allows more suitably performing parking space management that accords with a demand.

An information processing device, an information processing method in a controller in the information processing device, and a computer-readable storage medium non-transitorily storing a program will be described below with reference to the drawings.

Figure 1:
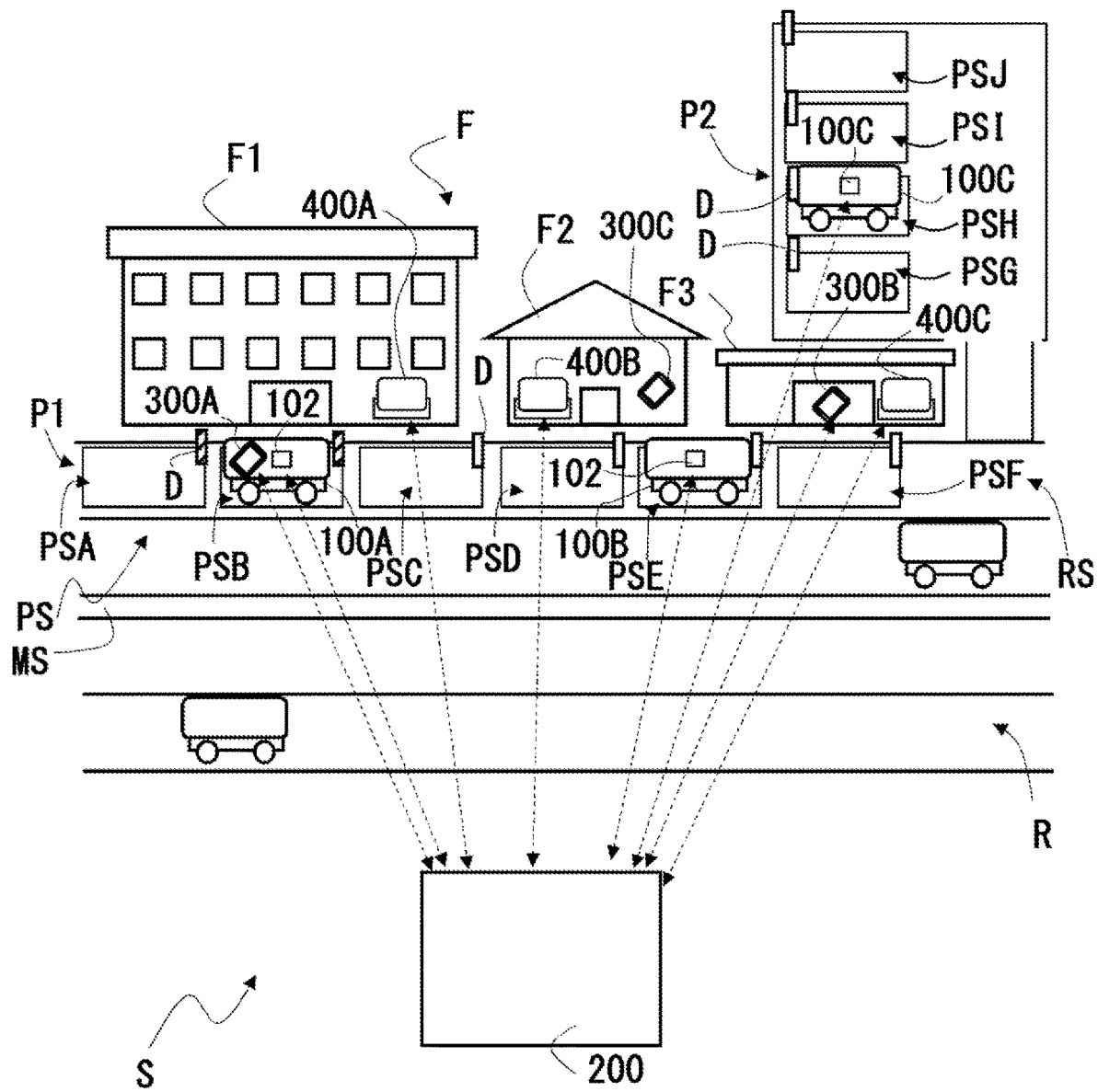
FIG. 1 is a conceptual diagram in one scene of a system according to an embodiment of the present disclosure.

A system S according to an embodiment of the present disclosure is conceptually illustrated in FIG. 1. FIG. 1 conceptually illustrates one scene in the system S. The system S can also be called a parking lot management system.

The system S includes a server device 200 which manages parking spaces in a parking lot P (P1, P2, . . . ) which allows parking of a vehicle, such as a running unit 100 (100A, . . . ). In FIG. 1, a road R is a road which includes a median strip MS and includes two lanes per direction, four lanes in total. A predetermined zone of one lane RS of the road R is set as the first parking lot P1, and the first parking lot P1 is partitioned into a plurality of parking spaces. Note that although FIG. 1 includes two parking lots, i.e., the first parking lot P1 and the second parking lot P2 as the parking lots P, the parking lots P1 and P2 are merely illustrative of parking lots. Although there are six parking spaces in the first parking lot P1 and there are four parking spaces in the second parking lot P2 in FIG. 1, this is by way of example only. The numbers of parking lots and parking spaces are not limited to these and may be any numbers.

The running unit 100 is a type of autonomous running vehicle here and is also called an Electric Vehicle (EV) palette. The running unit 100 is configured as a mobile body capable of automated driving and unattended driving. The running unit 100 need not be a vehicle capable of fully autonomous running. Although the running unit 100 is an autonomous running vehicle in the present embodiment, the running unit 100 can also run by being driven by a person or receiving driving assistance from the person. Note that the running unit 100 may be a vehicle incapable of autonomous running.

An information processing device 102 of the running unit 100 can communicate with the server device 200. A transmitter, such as a beacon, is provided in each parking space PS of the parking lot P. Here, a transmitter is provided in an information transmission device D at the side of each parking space. When the information processing device 102 of the running unit 100 receives radio waves from the transmitter, the information processing device 102 sends a message to that effect to the server device 200. With such transmission, the server device 200 can acquire information indicating the status of utilization of each parking space PS in the parking lot P and store an actual utilization figure of the parking space PS. Note that the server device 200 may be able to acquire the status of utilization of a vehicle, such as the running unit 100, which parks in the parking space PS without use of such a transmitter. For example, a parking management device (corresponding to, e.g., the information transmission device D) which is manipulated by a user or the like or senses parking of a vehicle via infrared or the like may be arranged in or near a parking space. In this case, the parking management device may be configured to be capable of communication with the server device 200, and the server device 200 may acquire and grasp such a status of utilization. Note that the information transmission device D includes a communication unit (corresponding to, for example, a communication unit 112) and is capable of communication with the server device 200 here. The information transmission device D includes a display change unit as a functional unit which transmits constraint information for a corresponding parking space and is configured to be capable of changing a display on the basis of display switching information acquired from the server device 200. Although transmission of constraint information for a corresponding parking space by the information transmission device D is performed through display, the transmission is not limited to visual means and may be executed through auditory means.

The information processing device 102 of the running unit 100 is also capable of communication with a user device 300 (300A, 300B, . . . ). Here, one user device 300 is associated with each running unit 100. In the example illustrated in FIG. 1, the user device 300A is associated with the running unit 100A, the user device 300B is associated with the running unit 100B, and the user device 300C is associated with the running unit 100C. Note that although the user device 300 to be associated with the running unit 100 is fixed here, the user device 300 may be variable. A plurality of user devices 300 may be associated with one running unit 100, and vice versa.

The server device 200 is also capable of communication with the user device 300. For example, the server device 200 can communicate with the user devices 300A and 300B in response to parking of the running units 100A and 100B in parking spaces of the first parking lot P1. Similarly, the server device 200 can communicate with the user device 300C in response to parking of the running unit 100C in a parking space of the second parking lot P2. For example, the server device 200 can send, to the user device 300, a notice prompting the parked running unit 100 associated with the user device 300 to move, for example, from a parking space in the first parking lot P1 to a parking space in the second parking lot P2.

The server device 200 can also communicate with facility devices 400 (400A, 400B, . . . ) of facilities F (F1, F2, . . . ), such as a shop and a school. The facility device 400A that is provided at the school F1, such as a preschool or an elementary school, the facility device 400B that is provided at the first commercial facility F2, and the facility device 400C that is provided at the second commercial facility F3 are given as examples in FIG. 1. These facilities and facility devices are examples of the facility F and the facility device 400. The types and number, and the like of facilities F may be arbitrarily determined, and the same applies to the number and the like of facility devices 400. The server device 200 allows managing the parking spaces PS in relation to the facility F by communicating with the facility device 400. For example, the server device 200 can acquire information, such as a class finish time at the school F1, by communicating with the facility device 400A provided at the school F1. The server device 200 makes it possible to cause the school F1 to bear the whole or a part of a parking fee for each parking space PS associated with the school F1 by communicating with the facility device 400A provided at the school F1. Acquisition of information on the facility F, management of how a parking fee for a parking space related to the facility F is borne, and the like as described above are the same as in the first and second commercial facilities F2 and F3 that are different facilities F.

FIG. 1 illustrates two parking lots P1 and P2 as examples. The first parking lot P1 includes a plurality of or, more specifically, six parking spaces PS. In a normal state or a reference state, of the six parking spaces PS, parking spaces PSA and PSB on the left of FIG. 1 are prescribed as first parking spaces with a first time limit. The first time limit is a relatively short time period, such as five minutes. In the normal state, of the six parking spaces, parking spaces PSC, PSD, PSE, and PSF on the right of FIG. 1 are prescribed as parking spaces with a second time limit. The second time limit is longer than the first time limit. Here, the second time limit is, for example, 30 minutes.

The second parking lot P2 includes a plurality of or, more specifically, four parking spaces PSG, PSH, PSI, and PSJ. The four parking spaces PSG, PSH, PSI, and PSJ are prescribed as third parking spaces with a third time limit. The third time limit is longer than the second time limit. The third time limit is, for example, one hour and can be extended.

In the present embodiment, the parking lot P1 is configured to be adapted to utilization by a user which utilizes the facility F that faces the road R for a short time period. A time limit appropriate to the associated facility F is prescribed for each parking space PS in the parking lot P1. The first parking spaces PSA and PSB are mainly assumed to be used to park vehicles for pickup and drop-off at the school F1 and thus include the first time limit. The second parking spaces PSC, PSD, PSE, and PSF are mainly assumed to be used to park vehicles of users as customers of the first and second commercial facilities F2 and F3 and thus include the second time limit.

The server device 200 causes the school F1 to bear a parking fee for the first parking space PSA or the like with the first time limit through communication with the facility device 400A of the school F1. Similarly, the server device 200 causes the first commercial facility F2 or the second commercial facility F3 to bear a parking fee for the second parking space PSC or the like with the second time limit through communication with the facility device 400B or 400C of the first commercial facility F2 or the second commercial facility F3. Note that each of the first and second commercial facilities F2 and F3 bears a half of a parking fee for the second parking space PSC or the like here.

In contrast to the first and second parking spaces, users as utilizers bear respective parking fees for the third parking spaces PSG to PSJ and the like in the second parking lot P2. Thus, the server device 200 causes the users that utilize the third parking spaces PSG to PSJ and the like with the third time limit to bear the parking fees for the third parking spaces PSG to PSJ and the like through communication with the user devices 300 of the users.

Figure 2:
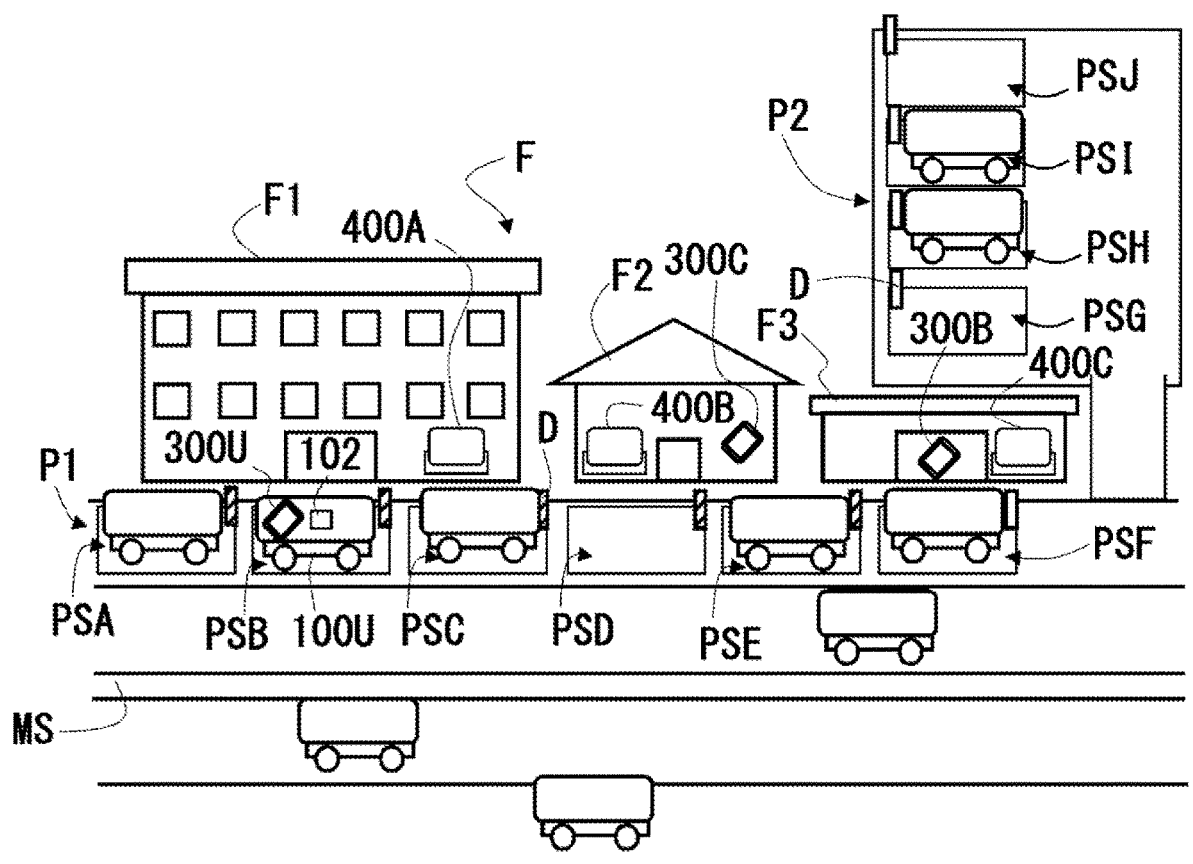
FIG. 2 is a conceptual diagram in another scene of the system in FIG. 1.

As illustrated in FIG. 2, when the first parking lot P1 is utilized to a predetermined or higher level, i.e., when the first parking lot P1 is in a state of being congested to a predetermined or higher level, the road R may be congested with vehicles which are parked and/or vehicles which desire to be parked. For this reason, processing in the server device 200 in the system S is executed in such a case in order to more effectively manage parking spaces.

For example, assume that, when a pupil leaves for home after classes at the school F1 are over, a parent or the like of the pupil comes to pick up the pupil. In this case, as illustrated in FIG. 2, the first parking lot P1 may enter a congested state, and not only the first parking spaces in the first parking lot P1 but also the second parking spaces may be utilized to park vehicles related to pupils of the school F1. In such a case, continuing to use the second parking spaces PSC, PSD, PSE, and PSF in the normal state with the second time limit is inferior in terms of efficiency. For this reason, the server device 200 in the system S according to the present embodiment predicts a demand for the first parking lot P1 and changes a ratio between first parking spaces and second parking spaces in accordance with the prediction. A demand for the first time limit of the first parking lot P1, in particular, is predicted, and when the demand for the first time limit is predicted to be at a predetermined or higher level, some or all of second parking spaces are changed to first parking spaces in accordance with the prediction.

The constituent elements related to the system S in FIG. 1 will be described below in detail. The running unit 100 will be first described.

Figure 3:
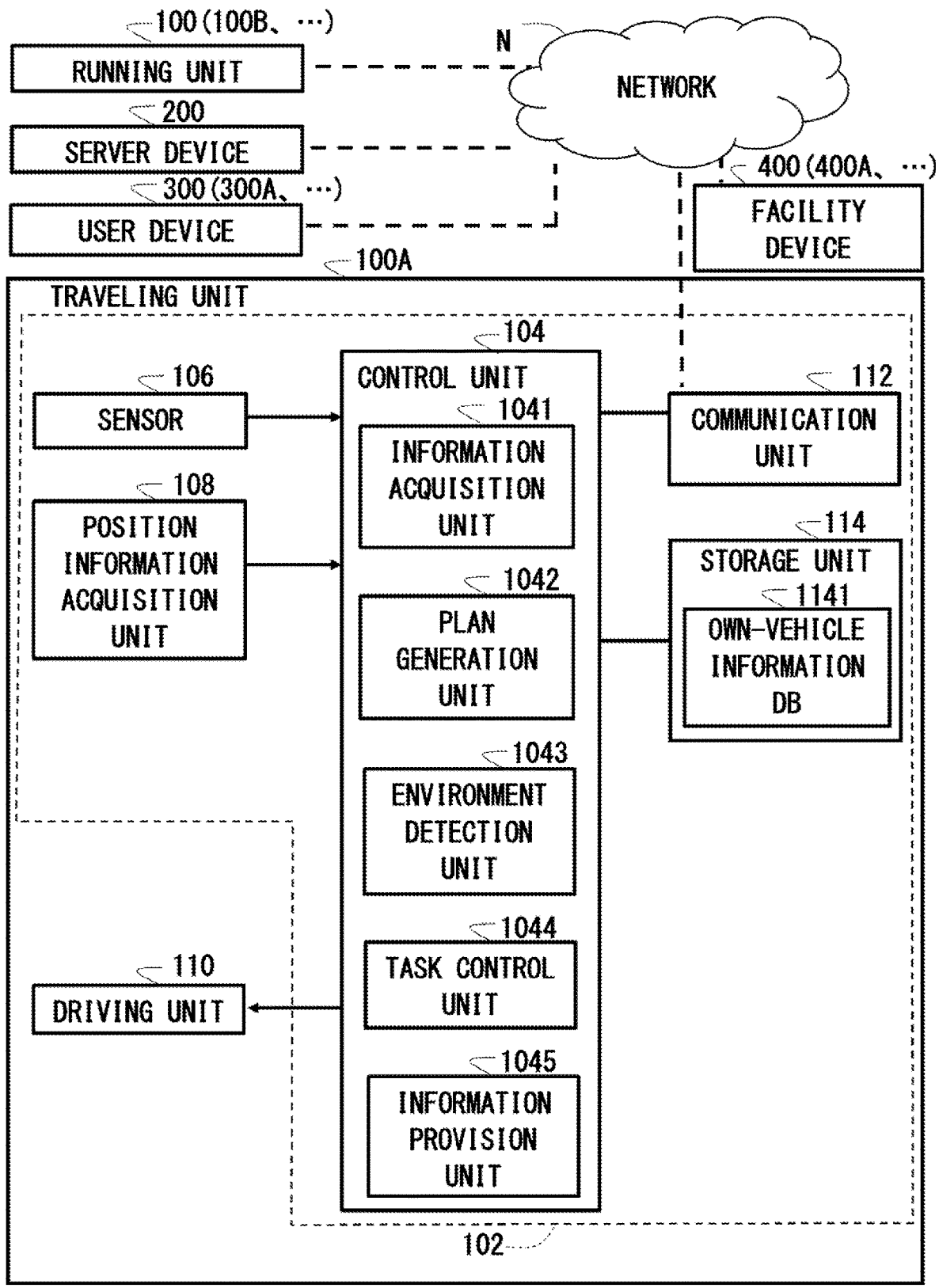
FIG. 3 is a block diagram schematically illustrating a configuration of the system in FIG. 1 and is a diagram particularly illustrating a configuration of a running unit.

FIG. 3 is a block diagram schematically illustrating a configuration of the system S including the running unit 100, the server device 200, the user device 300, and the facility device 400 and is a diagram particularly illustrating a configuration of the running unit 100A. FIG. 3 illustrates the configuration of the running unit 100A as an example of the running unit 100. A different running unit 100 (100B, . . . ) similarly includes components to be described below, such as the information processing device 102.

The running unit 100A in FIG. 3 includes the information processing device 102 and includes a control unit 104 that substantially takes on the function of the information processing device 102. The running unit 100A can perform running or the like in accordance with a command acquired from the server device 200. More specifically, the running unit 100A runs by a proper method while sensing surroundings of the vehicle, on the basis of an operation command acquired via a network N. Note that, as described above, the running unit 100A is also a vehicle, driving manipulation of which can be performed by a driver.

The running unit 100A is configured to further include a sensor 106, a position information acquisition unit 108, a driving unit 110, the communication unit 112, and a storage unit 114. The running unit 100A works on power supplied from a battery.

The sensor 106 is means for sensing the surroundings of the vehicle, and typical examples include a stereo camera, a laser scanner, a Light Detection and Ranging or Laser Imaging Detection and Ranging (LIDAR), and a radar. Information acquired by the sensor 106 is sent to the control unit 104. The sensor 106 includes a sensor for the own vehicle to perform autonomous running. The sensor 106 includes a camera which is provided at a vehicle body of the running unit 100A. For example, the camera can be a photographing device using a Charged-Coupled Device (CCD), Metal-Oxide-Semiconductor (MOS), or Complementary Metal-Oxide-Semiconductor (CMOS) image sensor, or the like.

The position information acquisition unit 108 is means for acquiring a current position of the running unit 100A. The position information acquisition unit 108 includes a receiver which receives radio waves from a transmitter, such as a beacon, as described above. A transmitter is provided, e.g., at the side of the road R, particularly at the information transmission device D at the side of each parking space PS, and regularly emits radio waves at a specific frequency and/or in signal form. The position information acquisition unit 108 is configured to include a Global Positioning System (GPS) receiver, and the like. A GPS receiver as a satellite signal receiver receives signals from a plurality of GPS satellites. Each GPS satellite is an artificial satellite which circles around the globe. A satellite positioning system, i.e., a Navigation Satellite System (NSS) is not limited to a GPS. Position information may be detected on the basis of signals from various satellite positioning systems. An NSS is not limited to a global navigation satellite system, examples of the NSS can include the Quasi-Zenith Satellite System, and "Galileo" of Europe or "Michibiki" of Japan that is operated integrally with a GPS can be included. Note that a position information detection system which the position information acquisition unit 108 includes is not limited to the above-described techniques.

The control unit 104 is a computer which controls the running unit 100A on the basis of pieces of information acquired from the sensor 106, the position information acquisition unit 108, and the like. The control unit 104 includes a CPU and a main storage unit and executes information processing in accordance with a program. The CPU is also called a processor. Note that the CPU is not limited to a single processor and may include a multiprocessor configuration. Alternatively, a single CPU which is connected by a single socket may include a multicore configuration. At least a part of processing by the above-described units may be performed by a processor other than the CPU, such as a dedicated processor (e.g., a Digital Signal Processor (DSP) or a Graphics Processing Unit (GPU)). Alternatively, at least a part of the processing by the above-described units may be performed by an integrated circuit (IC) or any other digital circuit. At least one(s) of the above-described units may include an analog circuit. The main storage unit of the control unit 104 is an example of a main memory. The CPU in the control unit 104 executes a computer program which is developed in the main storage unit so as to be executable and provides various types of functions. The main storage unit in the control unit 104 stores the computer program to be executed by the CPU and/or data, and the like. The main storage unit in the control unit 104 is a Dynamic Random Access Memory (DRAM), a Static Random Access Memory (SRAM), a Read Only Memory (ROM), or the like.

The control unit 104 is connected to the storage unit 114. The storage unit 114 is a so-called external storage unit, is used as a storage region which assists the main storage unit of the control unit 104, and stores the computer program to be executed by the CPU of the control unit 104 and/or data, and the like. The storage unit 114 is a hard disk drive, a Solid State Drive (SSD), or the like.

The control unit 104 includes, functional modules, an information acquisition unit 1041, a plan generation unit 1042, an environment detection unit 1043, a task control unit 1044, and an information provision unit 1045. The functional modules are implemented by, for example, executing the program stored in the main storage unit and/or the storage unit 114 by the control unit 104, i.e., the CPU thereof. Note that one(s) of the functional modules may be hardware, such as a different processor, digital circuit, or analog circuit.

The information acquisition unit 1041 acquires information, such as an operation command including a running plan, from the server device 200. The information acquisition unit 1041 regularly or irregularly acquires information (e.g., current position information) on the own vehicle and stores the information in an own-vehicle information database 1141 of the storage unit 114. The current position information includes information on a parking space acquired from the information transmission device D.

The plan generation unit 1042 generates an operation plan for the own vehicle on the basis of an operation command acquired from the server device 200, particularly information on a running plan included therein. Note that the operation plan generated by the plan generation unit 1042 is sent to the task control unit 1044 (to be described later). In the present embodiment, an operation plan is data prescribing a route to be run by the running unit 100A, an estimated date and time for each point on the route, and a process to be performed by the running unit 100A on a part or the whole of the route. For example, data expressing a route to be run by the own vehicle as a collection of road links can be taken as an example of data included in the operation plan. The route to be run by the own vehicle may be automatically generated using a given place of departure and a given destination by referring to map data stored in the storage unit 114 and being based on the information on the running plan included in the operation command. Alternatively, the route may be generated by utilizing an external service.

The environment detection unit 1043 detects an environment on the surroundings of the vehicle on the basis of data acquired by the sensor 106. Although examples of an object to be detected include the number and positions of lanes, the number and positions of vehicles present on the surroundings of the own vehicle, the number and positions of obstacles (e.g., a pedestrian, a bicycle, a structure, and a building) present on the surroundings of the own vehicle, the structure of the road, and road signs, an object to be detected is not limited to these. Anything may be adopted as an object to be detected as long as it is necessary to perform autonomous running. The environment detection unit 1043 may track a detected substance. For example, a relative velocity of the substance may be calculated from a difference between coordinates of the substance detected in an immediately preceding step and coordinates of the current substance. Data on the environment (hereinafter referred to as environmental data) detected by the environment detection unit 1043 is sent to the task control unit 1044 (to be described later).

The task control unit 1044 controls activation of the driving unit 110 of the own vehicle on the basis of an operation plan generated by the plan generation unit 1042, environmental data generated by the environment detection unit 1043, and position information of the own vehicle acquired by the position information acquisition unit 108. For example, the task control unit 1044 causes the own vehicle to run such that the own vehicle runs along a predetermined route and such that an obstacle is prevented from entering a predetermined safe region around the own vehicle. As a method for causing a vehicle to run autonomously, a publicly known method can be adopted. The task control unit 1044 can also execute a task other than a running task on the basis of the operation plan generated by the plan generation unit 1042.

The information provision unit 1045 provides, i.e., sends information on the own vehicle (e.g., information stored in an own-vehicle information database 1141) to the server device 200. The provision may be performed regularly or irregularly. For example, when the own vehicle starts parking in a parking space in the parking lot P1 or P2 and when the own vehicle separates from the parking space in the parking lot, the information provision unit 1045 provides information to that effect to the server device 200.

The driving unit 110 is means for causing the running unit 100A to run on the basis of a command generated by the task control unit 1044. The driving unit 110 is configured to include, for example, a motor for driving wheels, an inverter, brakes, a steering mechanism, and a secondary battery.

The communication unit 112 includes communication means for connecting the running unit 100A to the network N. In the present embodiment, the running unit 100A can communicate with a different device, such as the server device 200, via the network N. The running unit 100A is also capable of communication with the user device 300 via the network N. Note that the communication unit 112 may further include communication means for the running unit 100A as the own vehicle to perform inter-vehicle communication with a different running unit 100 (100B, . . . ).

Figure 4:
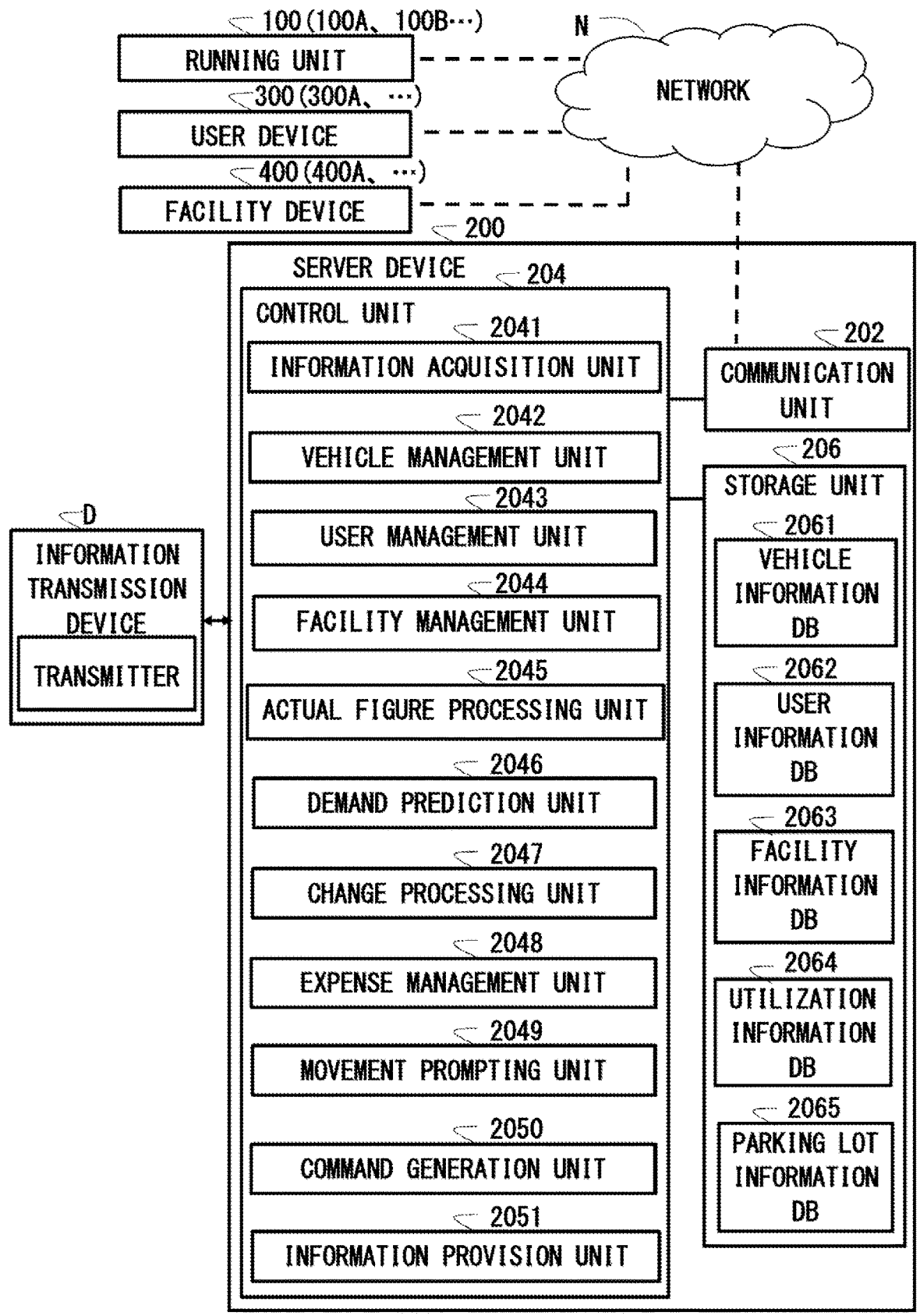
FIG. 4 is a block diagram schematically illustrating the configuration of the system in FIG. 1 and is a diagram particularly illustrating a configuration of a server device.

The server device 200 will be described. The server device 200 is an information processing device, and is configured to include a communication unit 202, a control unit 204, and a storage unit 206, as illustrated in FIG. 4. The communication unit 202 is the same as the communication unit 112 and includes a communication function for connecting the server device 200 to the network N. The communication unit 202 of the server device 200 is a communication interface for communication with each of the running unit 100, the user device 300, and the facility device 400 via the network N. The control unit 204 is configured in the same manner as in the control unit 104, includes a CPU and a main storage unit, and executes information processing by a program. The CPU, of course, is a processor, a configuration thereof may be a multiprocessor configuration, like that described in relation to the control unit 104, and the CPU may include a dedicated hardware circuit or the like. The main storage unit of the control unit 204 is also an example of a main memory. The CPU in the control unit 204 executes a computer program which is developed in the main storage unit so as to be executable and provides various types of functions. The main storage unit in the control unit 204 stores the computer program to be executed by the CPU and/or data, and the like. The main storage unit in the control unit 204 is a DRAM, an SRAM, a ROM, or the like.

The control unit 204 is connected to the storage unit 206. The storage unit 206 is an external storage unit, is used as a storage region which assists the main storage unit of the control unit 204, and stores the computer program to be executed by the CPU of the control unit 204 and/or data, and the like. The storage unit 206 is a hard disk drive, an SSD, or the like.

The control unit 204 is means responsible for controlling the server device 200. The control unit 204 includes, as functional modules, an information acquisition unit 2041, a vehicle management unit 2042, a user management unit 2043, a facility management unit 2044, an actual figure processing unit 2045, a demand prediction unit 2046, a change processing unit 2047, an expense management unit 2048, a movement prompting unit 2049, a command generation unit 2050, and an information provision unit 2051, as illustrated in FIG. 4. These functional modules are implemented by executing the program stored in the main storage unit and/or the storage unit 206 by the CPU of the control unit 204.

The information acquisition unit 2041 can acquire various types of information from the running unit 100, the user device 300, and the facility device 400. The information acquisition unit 2041 sends the acquired pieces of information to the vehicle management unit 2042, the user management unit 2043, the facility management unit 2044, and the like. The information acquisition unit 2041, for example, regularly acquires position information, information in the own-vehicle information database 1141, and the like from the running unit 100 and sends the pieces of information to the vehicle management unit 2042. The information acquisition unit 2041 also acquires information on the start and the end of parking in each parking space in the parking lot P from the running unit 100 and sends the information to the vehicle management unit 2042. The information acquisition unit 2041 further acquires pieces of information on a plurality of users registered or pieces of information input by the users from the user devices 300 that are associated with the users and sends the pieces of information to the user management unit 2043. The information acquisition unit 2041 acquires information on the facility F from the facility device 400 and sends the information to the facility management unit 2044.

The vehicle management unit 2042 manages information on a vehicle, such as the running unit 100. More specifically, the vehicle management unit 2042 receives information, such as pieces of data on the running units 100, from a plurality of running units 100 via the information acquisition unit 2041 and stores the information in a vehicle information database 2061 of the storage unit 206. Position information and vehicle information are used as information about the running unit 100. The vehicle information is, for example, an identifier, a mileage, and the like of the running unit 100.

The vehicle management unit 2042 stores information on the start and the end of parking in each parking space in the parking lot P, which is acquired from the running unit 100, in the vehicle information database 2061 here on each occasion of acquisition. The vehicle management unit 2042 sends parking-related information to the actual figure processing unit 2045 regularly or irregularly (e.g., when parking ends).

The user management unit 2043 stores information on a user, which is acquired from the user device 300, in a user information database 2062 of the storage unit 206. The information on the user includes information indicating which vehicle, i.e., which running unit 100 a vehicle related to the user or the user device 300 thereof is and the information is stored in association with identification information (e.g., a user ID or contact information) specific to the user.

The facility management unit 2044 stores information on the facility F which is acquired from the facility device 400 in a facility information database 2063 of the storage unit 206. Information on a facility can include a time related to the facility, such as a class finish time at the above-described school F1 and information on the status of congestion of the facility and can include, for example, information on a sale date and time at a commercial facility. The information on the facility is stored in association with identification information of the facility. Note that an amount of money to be borne by a facility of a parking fee for a parking space and payment information thereof are stored in the facility information database 2063. Payment processing is executed on the basis of communication between the server device 200 and the facility device 400. For example, the facility management unit 2044 regularly creates payment information including an amount of money to be borne for the facility device 400 and provides the payment information via the information provision unit 2051. On the basis of performance of payment processing by the facility device 400, the information acquisition unit 2041 of the server device 200 acquires information on payment completion. The information on payment completion is stored as a part of payment information in the facility information database 2063.

The actual figure processing unit 2045 stores, as actual figures on utilization of parking spaces in the parking lot P by the running units 100, pieces of information on the start and the end of parking of the running units 100 which are provided from the vehicle management unit 2042 in a utilization information database 2064 of the storage unit 206. The utilization information database 2064 is configured to accumulate actual utilization figures for first parking spaces with the first time limit. For example, for a Wednesday when the school F1 is open, an actual utilization figure for first parking spaces during a time slot from 8:00 to 8:30 is stored to be 100%, an actual utilization figure for first parking spaces during a time slot from 12:00 to 12:30 is stored to be 0%, and an actual utilization figure for first parking spaces during a time slot from 16:00 to 16:30 is stored to be 80%. Such an actual utilization figure is computed as the average of daily actual utilization figures. An actual utilization figure is stored not only in association with time information, such as a month and a day or a day of week, but also in association with class start and finish times at the school F1, business hours and event information of the first commercial facility F2 or the second commercial facility F3 in the facility information database 2063, or the like. An actual utilization figure may be expressed by, e.g., the number of parking spaces with parked cars.

The demand prediction unit 2046 predicts a demand for the first time limit of the first parking lot P1 on the basis of past actual utilization figures for the parking lot P1 which are stored in the utilization information database 2064. At the time of the prediction, the demand prediction unit 2046 predicts a demand in relation to, for example, a period or, more specifically, a period from a first time (in hours and minutes) to a second time (in hours and minutes) on the basis of the actual utilization figures. At the time of the prediction, the demand prediction unit 2046 also refers to pieces of information on the facilities F which are stored in the facility information database 2063. For example, for a Wednesday when the school F1 is open, an actual utilization figure for first parking spaces during a time slot, i.e., a period from 8:00 to 8:30 is 100%. For this reason, the demand prediction unit 2046 refers to the facility information database 2063. Since this period on this coming Wednesday is the same as usual, a demand for the first time limit of the first parking lot P1 is predicted to be "high" on a "low-moderate-high" scale. Note that demand prediction is not limited to three-point scale prediction and may be, for example, performed on the basis of a ratio or the like.

The change processing unit 2047 changes the ratio between the number of first parking spaces and the number of second parking spaces in the first parking lot P1 in accordance with demand prediction by the demand prediction unit 2046 and sets the changed ratio. For example, the change processing unit 2047 changes a predetermined number of second parking spaces to first parking spaces in accordance with the prediction. As described above, the parking lot P1 in the normal state is prescribed here to include the parking spaces PSA and PSB as first parking spaces with the first time limit and the parking spaces PSC, PSD, PSE, and PSF as second parking spaces with the second time limit. When a demand for first parking spaces is predicted to be "moderate", the parking spaces in the parking lot P1 are put in a state in the normal state here. When the demand for first parking spaces is predicted to be "low", a predetermined number of first parking spaces (one first parking space here) are changed to second parking spaces. When the demand for first parking spaces is predicted to be "high", a predetermined number of second parking spaces (three second parking spaces here) are changed to first parking spaces. Note that second parking spaces to be changed may be the three parking spaces PSC, PSD, and PSE closer to first parking spaces. When the demand for first parking spaces is predicted to be "high", all second parking spaces may be changed to first parking spaces. When the demand for first parking spaces is predicted to be "low", the ratio between first parking spaces and second parking spaces may be kept at that in the normal state. After such a change, the change processing unit 2047 sends a command so as to reflect information on the change in, e.g., a display on the information transmission device D. The information on the change is stored in a parking lot information database 2065. Information on parking spaces in the normal state is also stored in the parking lot information database 2065.

The expense management unit 2048 manages amounts of money to be borne while adjusting the ratio between first parking spaces and second parking spaces. The management of the amounts of money to be borne refers to management of an amount of money to be borne by a first facility which bears at least a part of a parking fee for a first parking space in the first parking lot P1 and an amount of money to be borne by a second facility which bears at least a part of a parking fee for a second parking space. As described above, here, the parking fee for a first parking space is borne by the school F1 as a first facility, and the parking fee for a second parking space is borne by the first commercial facility F2 or the second commercial facility F3 as a second facility. In accordance with the above-described change in the ratio between first parking spaces and second parking spaces by the change processing unit 2047, first parking spaces related to the first facility can increase or decrease, and second parking spaces related to the second facilities can increase or decrease. The expense management unit 2048 executes adjusting an amount of money to be borne by the first facility or the second facilities in response to increase or decrease in parking spaces. Note that the expense management unit 2048 adjusts amounts of money to be borne after further adjustment after a change based on the demand prediction described earlier. An amount of money to be borne after the adjustment is sent to each facility device 400 via the information provision unit 2051, and the expense management unit 2048 of the server device 200 executes processing related to the amount of money to be borne with the facility device 400. Note that although the expense management unit 2048 manages the amounts of money to be borne here, the expense management unit 2048 may support management of the amounts of money to be borne by a person and the like. In this case, for example, the expense management unit 2048 may simply send an amount of money to be borne after adjustment and/or information on increase or decrease in parking spaces to each facility device 400 and may not perform processing related to the amount of money to be borne.

When the movement prompting unit 2049 senses parking of the running unit 100 as a vehicle in a first parking space or a second parking space for not more than a first predetermined time period, the movement prompting unit 2049 sends a notice prompting movement of the running unit 100 to the user device 300 of a user of the running unit 100. Information on such a notice is stored in advance in the storage unit 206, and the notice is sent via the information provision unit 2051. Here, the first predetermined time period corresponds to the duration of the first time limit in the case of a first parking space and corresponds to the duration of the second time limit in the case of a second parking space. The predetermined time periods, however, can be arbitrarily set. When the movement prompting unit 2049 senses parking of the running unit 100 that is an autonomous running vehicle in a first parking space or a second parking space for a second predetermined time period, the movement prompting unit 2049 executes guiding the running unit to a different parking space which allows parking for an even longer time period. As an example of a different parking space which allows parking for an even longer time period, a parking space in the second parking lot P2 can be taken. The movement prompting unit 2049 checks whether any different parking space that allows parking for an even longer time period is vacant and executes guiding when there is a vacancy. Here, the second predetermined time period is a time period longer by a predetermined time period than the first time limit in the case of a first parking space and is a time period longer by a predetermined time period than the second time limit in the case of a second parking space. The time period, however, can be arbitrarily set. Sensing of parking of the running unit 100 in a first or second parking space for a predetermined time period is executed on the basis of information on parking in the parking space which is sent from the running unit 100. An elapsed time period since information on the start of parking is processed as a parking time period. Note that objects to be managed by the movement prompting unit 2049 are both first parking spaces and second parking spaces here. Objects to be managed by the movement prompting unit 2049, however, may be only first parking spaces. In this case, when the movement prompting unit 2049 senses parking of the running unit 100 in a first parking space for the second predetermined time period, the movement prompting unit 2049 may execute guiding the running unit 100 to a second parking space in the first parking lot P1.

The command generation unit 2050 generates a command corresponding to a parking space which is set by the change processing unit 2047. For example, when a demand for the first time limit is predicted to be "high", the respective information transmission devices D for the three parking spaces PSC, PSD, and PSE that are changed from second parking spaces to first parking spaces are caused to change in display. In FIG. 1, patterns on the information transmission devices D for the first parking spaces PSA and PSB are different from patterns on the information transmission devices D for the second parking spaces PSC, PSD, PSE, and PSF. The difference in pattern is the same as a difference between patterns on the information transmission devices D for the first parking spaces PSA, PSB, PSC, PSD, and PSE and a pattern on the information transmission device D for the second parking space PSF in FIG. 2. As described above, controlling displays on the information transmission devices D in order to control provision of first parking spaces and second parking spaces at a set ratio is executed by a command from the command generation unit 2050. When the command generation unit 2050 senses parking of the running unit 100 in a parking space in the first parking lot P1 for the second predetermined time period, the command generation unit 2050 generates a command to guide the running unit 100 to a different parking space which allows parking for an even longer time period. At this time, a command including position information of a parking space as a guiding destination is generated. Note that although a relationship between a pattern on the information transmission device D and a time limit of a parking space is made known by providing a sign for explaining the relationship in or near the first parking lot P1 here, the relationship may be made known by different means or a different method.

When the information provision unit 2051 acquires information on a change by the change processing unit 2047, the information provision unit 2051 refers to information on the information transmission device D in the storage unit 206 and provides the information to the information transmission device D through transmission. The information provision unit 2051 also sends a notice sent from the movement prompting unit 2049 to a target user device by referring to the user information database 2062 in the storage unit 206. The information provision unit 2051 further sends a command provided from the command generation unit 2050 to the target running unit 100 by referring to information on the running unit 100, i.e., the vehicle information database 2061.

The user device 300 will be described. The user device 300 is, for example, a mobile terminal, a smartphone, a personal computer, or the like. The user device 300A in FIG. 5 as an example includes a communication unit 302, a control unit 304, and a storage unit 306. The communication unit 302 and the storage unit 306 of the user device 300A are the same as the communication unit 202 and the storage unit 206, respectively, of the server device 200. The user device 300A further includes a display unit 308 and a manipulation unit 310. The display unit 308 is, for example, a liquid crystal display, an electroluminescence panel, or the like.

The manipulation unit 310 may be, for example, a keyboard, a pointing device, or the like. More specifically, in the present embodiment, the manipulation unit 310 includes a touch panel and is substantially integrated with the display unit 308.

The control unit 304 includes a CPU and a main storage unit, like the control unit 204 of the server device 200. A configuration of the CPU in the control unit 304 may be a multiprocessor configuration, like that described in relation to the control unit 104, and the CPU may include a dedicated hardware circuit or the like. The CPU of the control unit 304 executes an application program (application) 3061 which is stored in the storage unit 306. The application 3061 is an application program for access to a Web browser or information which is distributed from the server device 200. The application 3061 includes a GUI, accepts a user input, and sends the user input to the server device 200 via the network N. A user can know, via the user device 300, information on a parking space where a vehicle associated with the user, i.e., the running unit 100 is to be parked. The user can also input an answer to information provided from the server device 200 and send the answer to the server device 200 via the user device 300.

Each facility device 400 is the same as the user device 300. A user device when each facility is regarded as a user corresponds to the facility device 400. For this reason, in FIG. 5, reference character 400A for the facility device is placed alongside reference character 300A for the user device to indicate that the facility device 400A corresponds substantially to the user device 300A.

Figure 5:
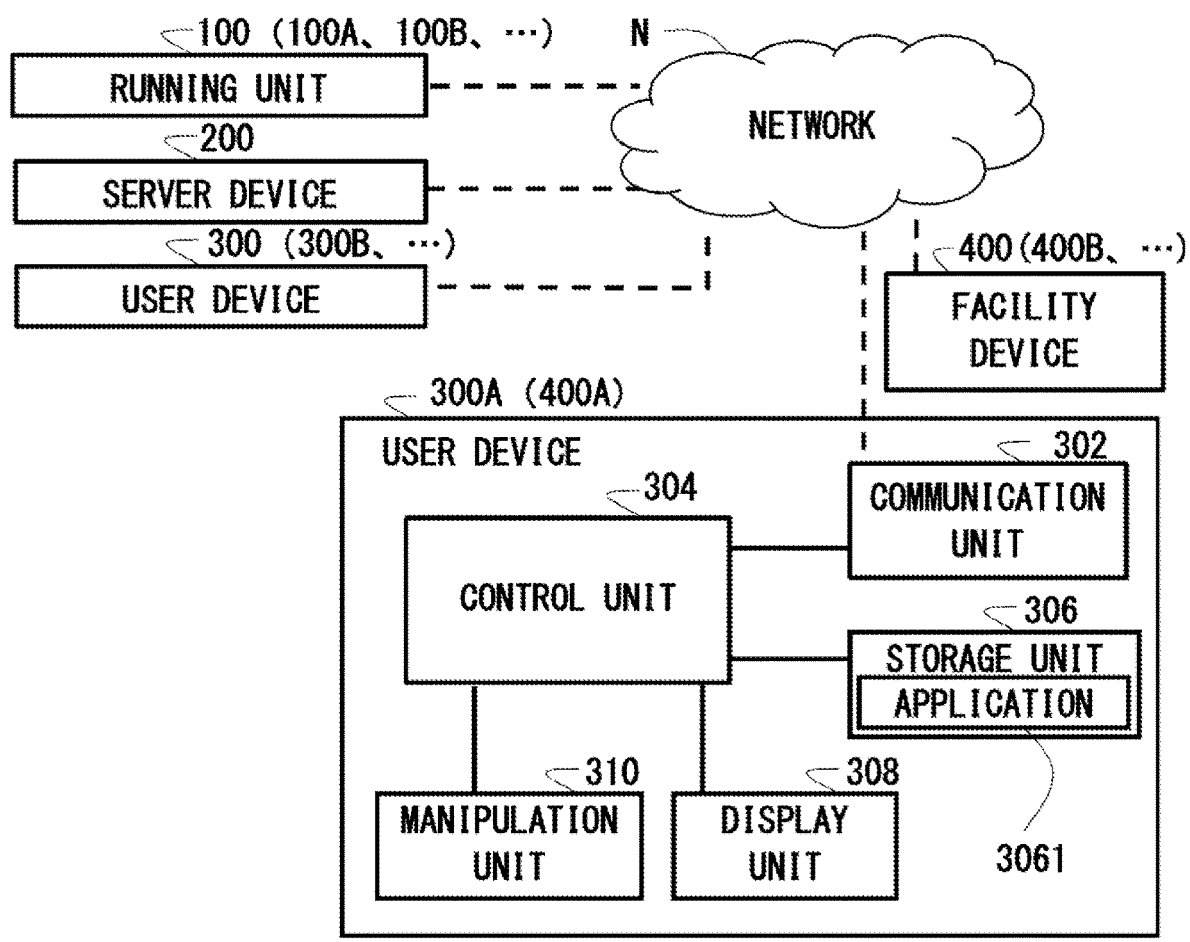
FIG. 5 is a block diagram schematically illustrating the configuration of the system in FIG. 1 and is a diagram particularly illustrating a configuration of a user device or a facility device.
Figure 6:
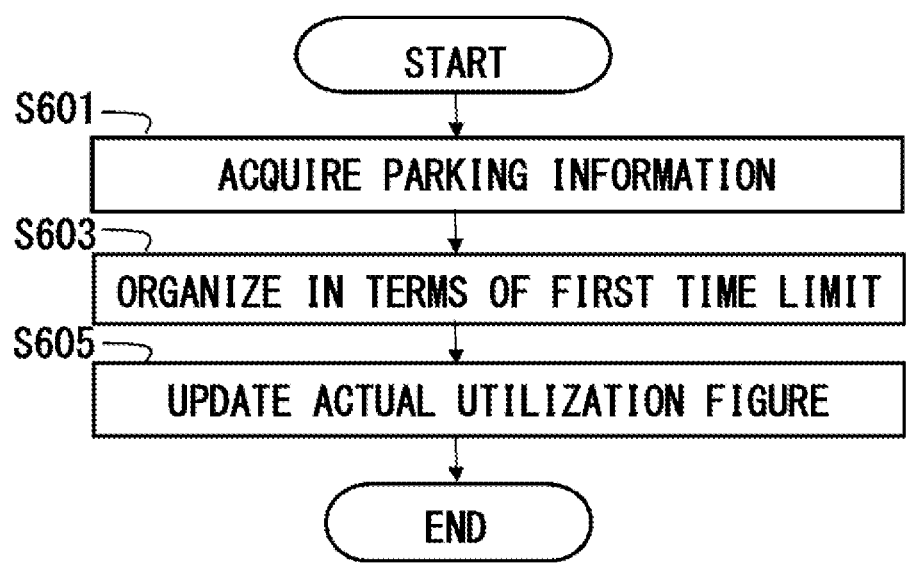
FIG. 6 is a flowchart of a certain process by a control unit of the server device in the system in FIG. 1.

Note that, in FIGS. 3, 4, and 5, the running unit 100, the server device 200, the user device 300, and the facility device 400 are connected by the same network N. Note that the connection may be implemented by a plurality of networks. For example, a network which connects the running unit 100 and the server device 200 and a network which connects the server device 200 and the user device 300 may be different networks.

Processing in the system S with the above-described configuration will be described on the basis of FIGS. 6 to 10 while referring to FIGS. 1 and 2. Accumulation of past actual utilization figures in the server device 200 will be described with reference to the flowchart in FIG. 6.

The actual figure processing unit 2045 of the control unit 204 acquires parking-related information which is sent by the vehicle management unit 2042 of the control unit 204 in the server device 200 (step S601). The actual figure processing unit 2045 organizes occasions of utilization of parking spaces in the first parking lot P1 into the degrees of utilization of parking spaces with the first time limit (step S603). The first parking lot P1 includes first parking spaces and second parking spaces, and which one to utilize depends on a user. For example, a second parking space may be utilized for only three minutes. The time period of three minutes is within the second time limit but is also within the first time limit. For this reason, in the case of utilization of a second parking space for such a short time period, the utilization is classified as utilization with the first time limit and organized. The organization in terms of the first time limit allows more accurate grasping of actual utilization figures of parking spaces with the first time limit.

The actual figure processing unit 2045 stores the degrees of utilization of parking spaces with the first time limit that are obtained through the organization as past actual utilization figures of the first parking lot P1 such that the degrees of utilization can be searched in association with a time slot (period) and one of various types of information on the facilities F (step S605). The past actual utilization figures are stored in the utilization information database 2064 of the storage unit 206. Past actual utilization figures thus stored are exploited in the demand prediction unit 2046, as described above.

Figure 7:
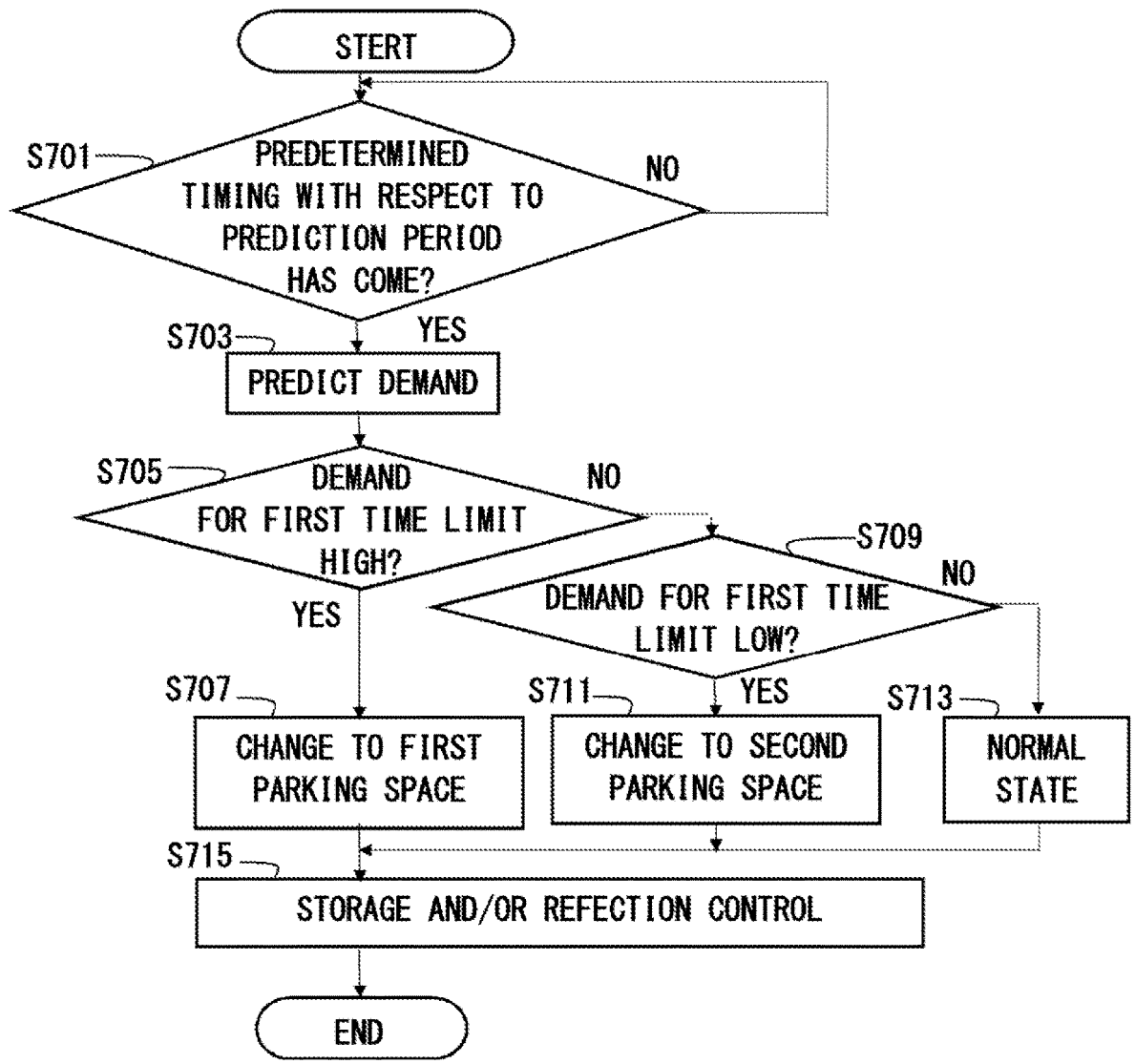
FIG. 7 is a flowchart of another process by the control unit of the server device in the system in FIG. 1.

Processing in the demand prediction unit 2046 and the change processing unit 2047 will be described on the basis of the flowchart in FIG. 7.

The demand prediction unit 2046 is configured to activate at a predetermined timing with respect to each prediction period. Here, the demand prediction unit 2046 activates at 30-minute intervals. Note that the predetermined timing with respect to a prediction period may come once or several times per day or regularly or irregularly. When the predetermined timing comes (YES in step S701), the demand prediction unit 2046 predicts a demand for the first time limit of the first parking lot P1 on the basis of past actual utilization figures of the first parking lot P1 stored in the utilization information database 2064 (step S703). At the time of the prediction, the demand prediction unit 2046 refers to pieces of information on the facilities F stored in the facility information database 2063. For example, when there are class start and finish times at the school F1, pieces of event information at the first and second commercial facilities F2 and F3, and the like, the demand prediction unit 2046 extracts a past actual utilization figure which conforms to a time slot, i.e., a period or an event and predicts a demand for the first time limit of the first parking lot P1 through predetermined computation. For example, a demand for the first time limit during a time slot from 8:00 to 8:30 a.m. on a Wednesday when the school F1 is open is predicted to be "high". This is because, for example, a past actual utilization figure for parking spaces with the first time limit which conforms to the time slot is 100%. Note that, as described earlier, the demand prediction unit 2046 predicts a demand for the first time limit of the parking lot P1 on a three-point (low-moderate-high) scale.

The change processing unit 2047 evaluates the predicted demand in order to change the ratio between first parking spaces and second parking spaces in accordance with the prediction made by the demand prediction unit 2046 (step S705). When the demand for the first time limit is predicted to be "high" (YES in step S705), the change processing unit 2047 changes a predetermined number (first predetermined number) of second parking spaces to first parking spaces in order to increase the ratio of parking spaces with the first time limit (step S707). Although the predetermined number is three here, the predetermined number may be a number other than three.

When the demand for the first time limit is predicted to be "low" (NO in step S705 and YES in step S709), a different change is executed. At this time, the change processing unit 2047 changes a predetermined number of first parking spaces to second parking spaces in order to decrease the ratio of parking spaces with the first time limit (step S711). Although the predetermined number is one here, the predetermined number may be a number other than one.

Note that when the demand for the first time limit is predicted to be "moderate" (NO in step S705 and NO in step S709), the change processing unit 2047 sets the ratio between first parking spaces and second parking spaces to that in the normal state (step S713).

In the above-described manner, the change processing unit 2047 sets the ratio between first parking spaces and second parking spaces in the first parking lot P1 while changing the ratio in accordance with a prediction based on past actual utilization figures of the first parking lot P1 as needed. The change processing unit 2047 stores a result of the change in the parking lot information database 2065 or sends display switching information based on the result to the information transmission devices D so as to control provision of first and second parking spaces at the set ratio (step S715). When the ratio between first parking spaces and second parking spaces is changed in the above-described manner, the change processing unit 2047 sends information on the change to the command generation unit 2050 so as to reflect the information in the information transmission devices D. The information on the change is sent to each information transmission device D and is used to produce a display and/or to transmit information from the information transmission device D to the user device 300 or the like (see, for example, patterns on the information transmission devices D in FIGS. 1 and 2).

Figure 8:
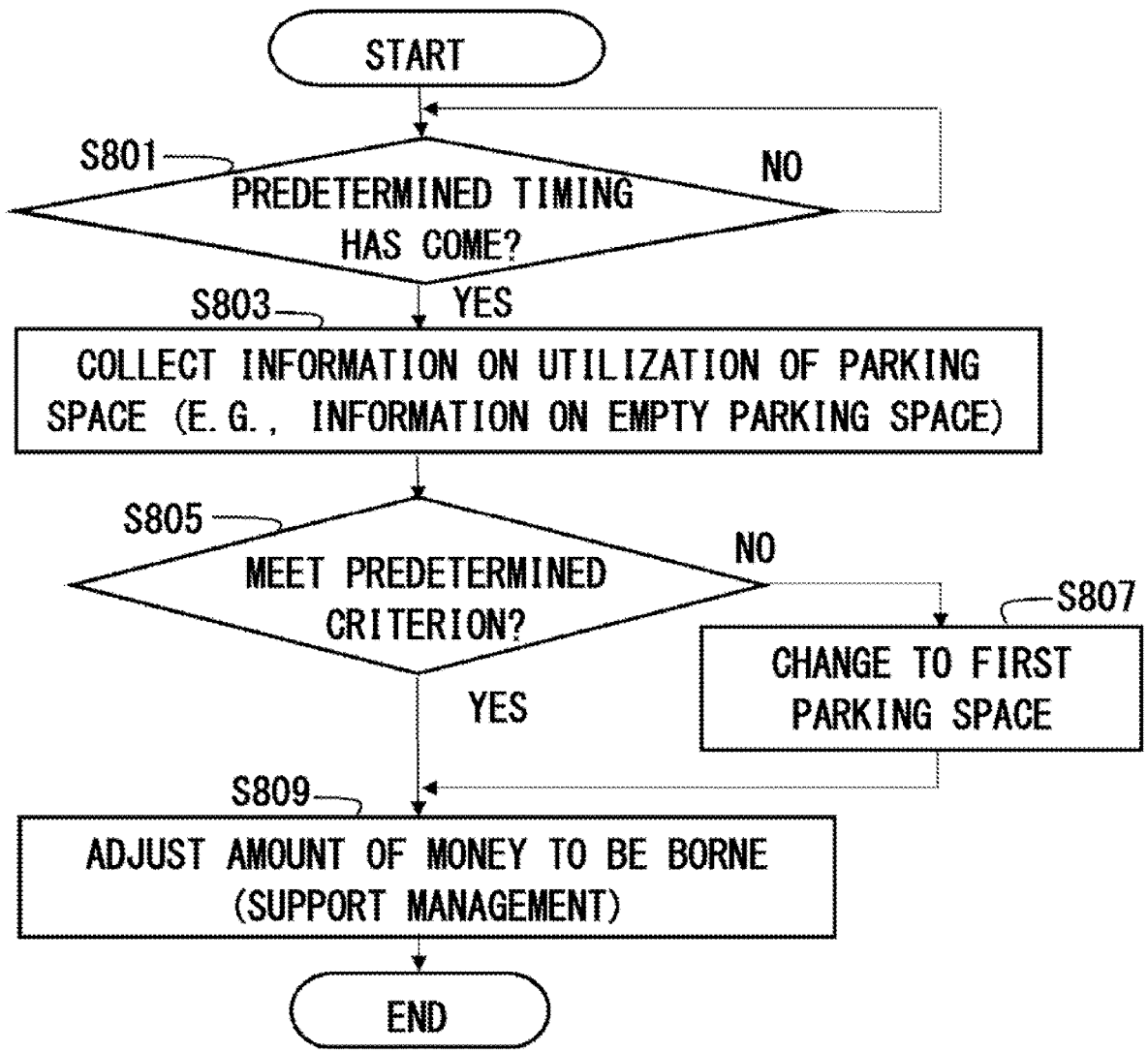
FIG. 8 is a flowchart of a different process by the control unit of the server device in the system in FIG. 1.

Parking space setting appropriate to a demand prediction may be out of conformity with the realities. For this reason, a process based on the flowchart in FIG. 8 is further executed by the expense management unit 2048 to correct setting appropriate to a prediction.

When the expense management unit 2048 of the control unit 204 in the server device 200 senses whether a predetermined timing has come (YES in step S801), the expense management unit 2048 activates. The predetermined timing here is when operation of the parking lot P1 with first parking spaces and second parking spaces at the ratio changed on the basis of the flowchart in FIG. 7 by the change processing unit 2047 is started. Alternatively, the predetermined timing can be set to a timing after a lapse of a predetermined time period (e.g., after a lapse of five minutes) since the start of the operation of the parking lot P1.

Upon the activation, the expense management unit 2048 collects pieces of information on utilization of the first parking lot P1 (step S803). The pieces of information on utilization of the first parking lot P1 can be acquired by referring to the vehicle information database 2061 in the storage unit 206. For example, the number of empty parking spaces out of the six parking spaces in the first parking lot P1 can be known, i.e., sensed by referring to the vehicle information database 2061. For example, it can be sensed here that there is only one empty parking space in the first parking lot P1.

The expense management unit 2048 judges whether information on the first parking lot P1 obtained through the collection meets a predetermined criterion (step S805). The number of empty parking spaces in the first parking lot P1 is used here as the information on the first parking lot P1 obtained through the collection. The predetermined criterion is defined as a value corresponding to a demand for the first time limit which is predicted by the demand prediction unit 2046. For example, when the demand for the first time limit is predicted to be "high", the predetermined criterion is prescribed as "not less than one". When the demand for the first time limit is predicted to be "moderate", the predetermined criterion is prescribed as "not less than three". When the demand for the first time limit is predicted to be "low", the predetermined criterion is prescribed as "not less than four". In the judgment, the number of parking spaces being utilized may be used instead of the number of empty parking spaces. Use of the number of parking spaces being utilized is equivalent to use of the number of empty parking spaces. Note that the information on the first parking lot P1 obtained through the collection that is used for judgment may be anything other than the number of empty parking spaces or the number of parking spaces being utilized. The predetermined criterion is not limited to the above-described value.

For example, when the number of empty parking spaces is "one" in a case where the demand for the first time limit is predicted to be "high" and the predetermined criterion is prescribed as "not less than one", the number is judged to meet the predetermined criterion (YES in step S805). In this case, the predicted demand for the first time limit fits the reality of actual utilization of the first parking lot P1.

For example, when the number of empty parking spaces is "zero" in the case where the demand for the first time limit is predicted to be "high" and the predetermined criterion is prescribed as "not less than one", the number is judged not to meet the predetermined criterion (NO in step S805). This means that the predicted demand for the first time limit falls below an actual demand for first parking spaces with the first time limit in the first parking lot P1. Thus, in this case, a process of further changing a predetermined number (second predetermined number) of second parking spaces to first parking spaces is executed (step S807). When the predicted demand for the first time limit is "high", there is only one second parking space in the first parking lot P1. In this case, the number of second parking spaces to be changed to first parking spaces is changed to "one". As described above, the number of second parking spaces to be changed here is not more than the number of second parking spaces that is set at that time. Note that the number of second parking spaces to be changed to first parking spaces can be set to any number, such as a half of the number of parking spaces set at that time, only one, or two. The changed number of parking spaces, i.e., the ratio is sent to the change processing unit 2047, and the process in step S715 described above is executed.

The expense management unit 2048 adjusts an amount of money to be borne by the first facility of parking fees for first parking spaces and an amount of money to be borne by the second facilities of parking fees for second parking spaces in accordance with the ratio of parking spaces fixed through step S805 or step S807 (step S809). Here, the school F1 bears an amount of money corresponding to (unit price of first parking space) x (the number of first parking spaces). The first and second commercial facilities F2 and F3 bear an amount of money corresponding to (unit price of second parking space)×(the number of second parking spaces). Note that the adjustment of the amounts of money to be borne is a merely example and that only either one of the amounts of money to be borne by the first facility and the second facilities may be adjusted. A part of a parking fee for a parking space may be borne by a user or the like of a vehicle to be parked. Note that, as described above, an amount of money to be borne after the adjustment is sent to each facility device 400 via the information provision unit 2051, and the expense management unit 2048 of the control unit 204 in the server device 200 executes processing related to the amount of money to be borne with the facility device 400. Note that, as described above, management itself may not be performed here and that support of the management may be performed.

Processes for increasing the efficiency of utilization of parking spaces in the first parking lot P1 will be described with reference to FIGS. 9 and 10. A part of processing by the movement prompting unit 2049 will be described with reference to FIG. 9.

The movement prompting unit 2049 starts a subsequent process by sensing parking of a vehicle in a first parking space or a second parking space in the first parking lot P1 for the first predetermined time period. Although both first parking spaces and second parking spaces are regarded as objects here, only first parking spaces may be regarded. The movement prompting unit 2049 refers to the vehicle information database 2061 in the storage unit 206 and senses a parking time period of a vehicle in each parking space. The movement prompting unit 2049 judges whether the sensed parking time period is not less than the first predetermined time period (step S901). Note that, as described above, the first predetermined time period here corresponds to the duration of the first time limit in the case of a first parking space and corresponds to the duration of the second time limit in the case of a second parking space.

In order to send, to the user device 300 of a user of a vehicle, a parking time period of which is not less than the first predetermined time period, a notice prompting movement of the vehicle, i.e., the running unit 100, the movement prompting unit 2049 reads out the notice from the storage unit 206 and sends the notice to the information provision unit 2051 (step S903). At this time, the vehicle information database 2061 and the user information database 2062 are referred to.

For example, a case where a parking time period for a running unit 100U in the parking space PSB has reached the first predetermined time period in FIG. 2 (YES in step S901) will be described. In this case, the running unit 100U may continue to be parked, which is not preferable in terms of management of the first parking lot P1. For this reason, the movement prompting unit 2049 sends a notice prompting movement from the parking space PSB to a user device 300U of a user which is associated with the running unit 100U (step S903).

When the running unit 100U does not move despite the notice prompting movement, since the running unit 100U is an autonomous running vehicle, the movement prompting unit 2049 executes guiding to a parking space which allows parking for an even longer time period. The processing will be described with reference to FIG. 10.

The movement prompting unit 2049 starts subsequent processes by sensing parking of the running unit 100U in a first parking space or a second parking space in the first parking lot P1 for the second predetermined time period (step S1001). Although both first parking spaces and second parking spaces are regarded as objects here, as in step S901 described above, only either one (e.g., only first parking spaces) of the first parking spaces and the second parking spaces may be regarded as objects. The movement prompting unit 2049 refers to the vehicle information database 2061 in the storage unit 206 and senses a parking time period of a vehicle in each parking space. The movement prompting unit 2049 judges whether the sensed parking time period is not less than the second predetermined time period (step S1001). Note that, as described above, the second predetermined time period is a time period longer by a predetermined time period (e.g., five minutes) than the first time limit in the case of a first parking space and is a time period longer by a predetermined time period (e.g., 10 minutes) than the second time limit in the case of a second parking space.

When the parking time period of the running unit 100 is not less than the second predetermined time period (YES in step S1001), the movement prompting unit 2049 judges whether there is an empty parking space in the second parking lot P2 (step S1003). As already described, the second parking lot P2 includes the parking spaces PSG, PSH, PSI, and PSJ which allow parking for a longer time period than in the first parking lot P1. Whether there is an empty parking space among the parking spaces can be judged by referring to the vehicle information database 2061. For example, in FIG. 2, there are empty parking spaces (e.g., the parking spaces PSG and PSJ) in the second parking lot P2. The movement prompting unit 2049 sends information on the running unit 100U sensed in step S1001 and information on an empty parking space (e.g., the parking space PSG) in the second parking lot P2 to the command generation unit 2050 so as to guide the running unit 100U sensed in step S1001 to the empty parking space. Note that the movement prompting unit 2049 is programmed here so as to, when there is a plurality of empty parking spaces in the second parking lot P2, select an empty space closer to the road R. Note that, when parking spaces regarded as objects are only first parking spaces, a parking space which allows parking for a longer time period in step S1003 may be a second parking space in the first parking lot P1.

The command generation unit 2050 generates a command addressed to the sensed running unit 100U on the basis of information which is provided from the movement prompting unit 2049 (step S1005). The command includes position information of the empty parking space (e.g., the parking space PSG) in the second parking lot P2. The command generation unit 2050 sends the generated command to the information provision unit 2051, and the information provision unit 2051 sends the command to the running unit 100U. With this command, the running unit 100U is guided to the empty parking space (the parking space PSG) in the second parking lot P2. As a result, the first parking lot P1 includes a vacancy, and utilization of the vacancy is prompted. Note that, at this time, the user device 300U associated with the running unit 100U is also notified of the guiding of the running unit 100U.

At the time of the generation and sending of the command, the command generation unit 2050 sends a signal disapproving parking of any other vehicle to the information transmission device D for the parking space PSG so as to prevent a different vehicle from being parking in the empty parking space (the parking space PSG) in the second parking lot P2. With this signal, the information transmission device D for the parking space PSG here sounds a buzzer to block parking of any other vehicle. Note that blocking of parking of any other vehicle may be performed by means or a method other than sounding of a buzzer.

Note that, when there is no empty parking space in the second parking lot P2 (NO in step S1003), guiding of the running unit 100U is not performed. In this case, step S1001 is executed again here. Note that the processes in S1001 to S1003 may be performed at proper intervals.

As has been described above, the control unit 204 of the server device 200 in the system S executes setting the ratio between the number of first parking spaces and the number of second parking spaces, on the basis of past actual utilization figures of the parking lot P1 including first parking spaces with the first time limit and second parking spaces which allow parking for a longer time period than the first time limit. The control unit 204 executes controlling provision of first parking spaces and second parking spaces at the set ratio. It is thus possible to more suitably perform parking space management that accords with a demand.

The above-described embodiment is merely illustrative, and the present disclosure can be properly changed and implemented without departing from the scope thereof. The processes and/or means described in the present disclosure can be partially extracted and implemented or can be freely combined and implemented as long as there is no technical contradiction.

A process described as being performed by one device may be shared and executed by a plurality of devices. For example, the server device 200 that is an information processing device need not be one computer and may be configured as a system including a plurality of computers. Alternatively, a process described as being performed by different devices may be executed by one device. By which hardware configuration functions are implemented in a computer system can be flexibly changed. The same applies to, e.g., the information processing device 102 of the running unit 100.

The present disclosure can also be implemented by supplying a computer program including the functions described in the above-described embodiment to a computer and reading out and executing the program by one or more processors of the computer. This computer program may be provided to the computer as a non-transitory computer-readable storage medium connectable to a system bus of the computer or may be provided to the computer via a network. Examples of the non-transitory computer-readable storage medium include any type of disk, such as a magnetic disk (e.g., a Floppy® disk or a hard disk drive (HDD)) or an optical disc (e.g., a CD-ROM, a DVD, or a Blu-ray Disc), a read only memory (ROM), a random access memory (RAM), an EPROM, an EEPROM, a magnetic card, a flash memory, an optical card, and any type of medium adapted to storing electronic instructions.

What is claimed is:

1. An information processing device comprising
a controller including at least one processor configured to execute:
setting a ratio between number of first parking spaces and number of second parking spaces, on the basis of a past actual utilization figure of a parking lot including the first parking spaces with a first time limit and the second parking spaces that allow parking for a longer time period than the first time limit; and
controlling provision of the first parking spaces and the second parking spaces at the set ratio.

2. The information processing device according to claim 1, wherein
the setting the ratio comprises changing the ratio in accordance with a period, on the basis of the actual utilization figure.

3. The information processing device according to claim 1, wherein
the controller further executes
sending a notice prompting movement of a vehicle of a user to a device of the user of the vehicle whose parking is sensed, when the controller senses parking of the vehicle in the first parking space for not less than a first predetermined time period.

4. The information processing device according to claim 1, wherein
the controller further executes
guiding an autonomous running vehicle to the second parking space or a different parking space that allows parking for an even longer time period, when the controller senses parking of the autonomous running vehicle in the first parking space for not less than a second predetermined time period.

5. The information processing device according to claim 1, wherein
the controller further executes
collecting information on utilization of the parking lot at a predetermined timing, and
changing a predetermined number of ones of the second parking spaces to the first parking spaces, when an empty parking space in the parking lot does not meet a predetermined criterion.

6. The information processing device according to claim 1, wherein
the controller further executes
supporting management of an amount of money to be borne by a first facility that bears at least a part of a parking fee for the first parking space and an amount of money to be borne by a second facility that bears at least a part of a parking fee for the second parking space.

7. The information processing device according to claim 6, wherein
the supporting the management of the amounts of money to be borne comprises adjusting the amount of money to be borne by at least either one of the first facility and the second facility on the basis of changing of the ratio between the number of the first parking spaces and the number of the second parking spaces.

8. An information processing method, the method comprising:
setting a ratio between number of first parking spaces and number of second parking spaces, on the basis of a past actual utilization figure of a parking lot including the first parking spaces with a first time limit and the second parking spaces that allow parking for a longer time period than the first time limit; and
controlling provision of the first parking spaces and the second parking spaces at the set ratio.

9. The information processing method according to claim 8, wherein
the setting the ratio comprises changing the ratio in accordance with a period, on the basis of the actual utilization figure.

10. The information processing method according to claim 8, wherein
sending a notice prompting movement of a vehicle of a user to a device of the user of the vehicle whose parking is sensed, when sensing parking of the vehicle in the first parking space for not less than a first predetermined time period.

11. The information processing method according to claim 8, wherein
guiding an autonomous running vehicle to the second parking space or a different parking space that allows parking for an even longer time period, when sensing parking of the autonomous running vehicle in the first parking space for not less than a second predetermined time period.

12. The information processing method according to claim 8, wherein
collecting information on utilization of the parking lot at a predetermined timing, and
changing a predetermined number of ones of the second parking spaces to the first parking spaces, when an empty parking space in the parking lot does not meet a predetermined criterion.

13. The information processing method according to claim 8, wherein
supporting management of an amount of money to be borne by a first facility that bears at least a part of a parking fee for the first parking space and an amount of money to be borne by a second facility that bears at least a part of a parking fee for the second parking space.

14. The information processing method according to claim 13, wherein
the supporting the management of the amounts of money to be borne comprises adjusting the amount of money to be borne by at least either one of the first facility and the second facility on the basis of changing of the ratio between the number of the first parking spaces and the number of the second parking spaces.

15. A computer-readable storage medium non-transitorily storing a program for causing at least one computer to execute:
setting a ratio between number of first parking spaces and number of second parking spaces, on the basis of a past actual utilization figure of a parking lot including the first parking spaces with a first time limit and the second parking spaces that allow parking for a longer time period than the first time limit; and
controlling provision of the first parking spaces and the second parking spaces at the set ratio.

16. The computer-readable storage medium non-transitorily storing the program according to claim 15, wherein
the setting the ratio comprises changing the ratio in accordance with a period, on the basis of the actual utilization figure.

17. The computer-readable storage medium non-transitorily storing the program according to claim 15, wherein
the computer-readable storage medium causes the at least one computer to further execute
sending a notice prompting movement of a vehicle of a user to a device of the user of the vehicle whose parking is sensed, when the at least one computer senses parking of the vehicle in the first parking space for not less than a first predetermined time period.

18. The computer-readable storage medium non-transitorily storing the program according to claim 15, wherein
the computer-readable storage medium causes the at least one computer to further execute
guiding an autonomous running vehicle to the second parking space or a different parking space that allows parking for an even longer time period, when the at least one computer senses parking of the autonomous running vehicle in the first parking space for not less than a second predetermined time period.

19. The computer-readable storage medium non-transitorily storing the program according to claim 15, wherein
the computer-readable storage medium causes the at least one computer to further execute
collecting information on utilization of the parking lot at a predetermined timing, and
changing a predetermined number of ones of the second parking spaces to the first parking spaces, when an empty parking space in the parking lot does not meet a predetermined criterion.

20. The computer-readable storage medium non-transitorily storing the program according to claim 15, wherein
the computer-readable storage medium causes the at least one computer to further execute
supporting management of an amount of money to be borne by a first facility that bears at least a part of a parking fee for the first parking space and an amount of money to be borne by a second facility that bears at least a part of a parking fee for the second parking space, and
the supporting the management of the amounts of money to be borne comprises adjusting the amount of money to be borne by at least either one of the first facility and the second facility on the basis of changing of the ratio between the number of the first parking spaces and the number of the second parking spaces.

* * * * *